3,067,253
Patented Dec. 4, 1962

3,067,253
CATALYTIC REDUCTION OF HALOAROMATIC NITRO COMPOUNDS TO HALOAROMATIC AMINES
Andrew J. Dietzler and Theodore R. Keil, Midland, Mich., assignors to The Dow Chemical Company, Midland, Mich., a corporation of Delaware
No Drawing. Filed July 3, 1958, Ser. No. 746,334
19 Claims. (Cl. 260—575)

This invention relates to processes for the catalytic hydrogenation of halonitroaromatic compounds to form the corresponding haloamino compounds.

It is well known that aromatic nitro compounds may be catalytically hydrogenated to produce the corresponding amino compounds. Heretofore however, such processes have been unsatisfactory for the preparation of haloamines because the halogen is usually removed from the aromatic compound by the hydrogenation step. Moreover, many hydrogenation catalysts are poisoned by the halonitro and/or the haloamino compounds. In attempting to avoid these difficulties, special catalysts have been proposed. For example, in Patent No. 2,772,313 the use of a specially prepared rhodium catalyst is disclosed. Such catalysts are expensive and often difficult to produce and, moreover, have not been generally useful in the production of many haloamines, especially bromoamines.

It is an object of this invention to provide processes for making haloamines by the hydrogenation of aromatic halonitro compounds. Another object is to provide effective and inexpensive catalyst systems for the hydrogenation of halonitro aromatic compounds to form the corresponding haloamines. Other objects will appear hereinafter.

According to the invention, aromatic haloamines wherein the halogen has an atomic number below 36 are readily prepared from the corresponding halonitro compounds by hydrogenation in the presence of nickel and a compound selected from the group consisting of calcium and magnesium hydroxides, sodium and calcium carbonates and sodium and calcium acetates.

The reaction of the invention may be conducted under the usual conditions suitable for the catalytic conversion of aromatic nitro groups to amino groups; i.e., at a temperature of about 20 to 100° C. and a hydrogen pressure of about 1 to 30 atmospheres. The time required for substantially complete reaction is usually about 1 to 24 hr. and is readily determined from the consumption of hydrogen. While ordinarily the reaction simply ceases when the nitro groups have all been reduced, and no substantial harm is done by prolonging the reaction period beyond that necessary, certain haloamines are sensitive to hydrogen under the more drastic reaction conditions and may be partially dehydrohalogenated if severe conditions and unduly long reaction times are used. In general, the bromo compounds are less stable than the corresponding chloro compounds while the fluoro compounds are more stable. The stability of the halogen substituent is highly dependent on the position and type of other substituents on the same benzene ring. Thus, it is highly activated by halogen, phenyl or, especially hydroxyl substituents in the ortho or para position. Accordingly, when a nitro compound containing such an activated halogen substituent is to be hydrogenated, it is advisable to do so at the lowest practicable temperature and hydrogen pressure and to minimize the time during which the haloamine product is exposed to hydrogenation conditions.

Substantially any aromatic haloamine for which the corresponding nitro compound is available may be prepared by the present process. Haloamines that may be thus prepared include, for instance, the haloanilines, such as o-chloroaniline, m-bromoaniline, p-fluoroaniline, 2,3-, 2,4- and 3,4-dichloroaniline, 2,5-dibromoaniline, 2,6-difluoroaniline and 2,3,5-trichloroaniline; the haloaminophenols, such as 3-bromo-, 3-chloro- or 3-fluoro-4-aminophenol, 2,3-dichloro-4-aminophenol, 3-chloro-5-aminophenol and 2-bromo-5-aminophenol; the halobiphenylamines, such as 4-fluoro-, 4-chloro- or 4-bromo-3-biphenylamine, 3-bromo-3'-biphenylamine, 3,5,4',5'-tetrachloro-3'-biphenylamine and 2,5-dichloro-3-fluoro-2' biphenylamine; alkylhaloanilines, such as 2-fluoro-5-methylaniline, 3-chloro-5-sec.-butylaniline, 2-bromo-6-tert.-amylaniline, 3,4-dichloro-6-ethylaniline and 2-chloro-4-methyl-5-isooctylaniline; haloaminophenylaliphatic acids, such as 2-chloro-4-aminobenzoic acid, 3-bromo-5-aminobenzoic acid, 2,6-dichloro-3-aminobenzoic acid, 3-chloro-5-aminophenylacetic acid, 2,4-dichloro-5-aminophenoxy acetic acid, 2(2,4,5-trichloro-6-amino-phenoxy)propionic acid and 3-fluoro-4-phenyl-5-aminobenzoic acid; and the like.

The term "haloaniline," as used herein, refers to and includes substituted haloanilines wherein the substituent is on the same benzene ring as the amino group of the aniline; thus including, for instance, alkylhaloanilines, phenylhaloanilines, (substituted phenyl) haloanilines, carboxyl-substituted haloanilines, hydroxyl-substituted haloanilines, and the like.

In carrying out the process of the invention, the nitro compound to be reduced may be dissolved in a suitable inert solvent, such as methanol or other lower alkanol; an aromatic hydrocarbon, such as benzene, toluene, xylene, cumene or cymene; an ether, such as diethyl, diisopropyl, phenyl methyl or diphenyl ether, tetrahydrofuran, ethoxyethanol, diglycol dimethyl ether and the like. The preferred solvents are those in which water is readily soluble, such the lower alkanols and ketones. The use of a solvent, however, is not necessary and frequently satisfactory results may be obtained by hydrogenating the undiluted nitro compound. The proportions of nitro compound, catalyst and promotor are non-critical, the optimum proportions being readily determined by experiment. Obviously, the higher the ratio of catalyst to nitro compound, the more rapid the reaction. Usually about 0.01 to 0.5 part, by weight, of finely divided nickel is used per part of nitro compound. The amount of promotor is usually based on the amount of nickel used and may suitably be about 0.01 to 1.0 part, by weight, per part of nickel.

A general procedure that has been found satisfactory comprises placing the nitro compound, nickel catalyst and promotor, with or without a solvent, in a reactor, displacing the air therein with hydrogen, sealing the reactor and agitating the contents while maintaining a hydrogen pressure of about 1 to 30 atmospheres and a temperature of about 20 to 100° C. until the theoretical absorption of hydrogen has occurred, this usually requiring about 1 to 24 hours. The pressure is then adjusted to atmospheric, the contents are removed from the reactor, the catalyst is separated by filtration or decantation, the solvent, if any, is distilled from the product and the latter is isolated and purified by any suitable method, such as distillation or crystallization. The catalyst usually retains its activity and may be reused indefinitely. In contrast, if the promotor is omitted the catalyst usually loses most or all of its activity in a single use.

The practice of the invention is illustrated by the following examples.

*Example 1.—Effect of Calcium Hydroxide on the Activity of Raney Nickel Catalyst*

(a) Without $Ca(OH)_2$—30.3 g. (0.15 mole) of 1-bromo-3-nitrobenzene, 150 cc. of methyl alcohol and 3 g. of Raney nickel sludge were combined in a 500 cc. Parr hydrogenator bottle. The air was evacuated from the bottle and the mixture agitated under a hydrogen pressure of 27–40 p.s.i.g. at 25° C. for 5.5 hours. Hydrogen (0.45 mole) was absorbed.

The reaction mixture was let stand to settle the catalyst. The clear solution was decanted and the catalyst washed with methyl alcohol. Washings were added to the main reaction mixture. This solution was distilled. After methanol and water had been removed there was added 0.55 g. of NaOH and distillation continued to produce 19.5 g. of water-white liquid, m-bromoaniline; B.P., 114–120° C./10 mm.; F.P. 10.5° C.; $N_D^{20.5}$, 1.6212; yield, 75.5%.

(b) With $Ca(OH)_2$ additive—30.3 g. (0.15 mole) of 1-bromo-3-nitrobenzene, 150 cc. of methyl alcohol, 3 g. of Raney nickel sludge and 0.3 g. of $Ca(OH)_2$ were combined in a 500 cc. Parr hydrogenator bottle and agitated at a hydrogen pressure of 50 p.s.i.g. and 27° C. at the start. In 0.75 hr. the theoretical amount (0.45 mole) of hydrogen was absorbed. The final temperature was 66° C. and the final pressure 15 p.s.i.g. The catalyst was let settle and the clear solution was decanted from the catalyst. A second charge of 30.3 g. of 1-bromo-3-nitrobenzene and 150 cc. of methanol were added to the catalyst retained in the reaction flask. Hydrogenation was started at 50 p.s.i.g. and 30° C. In 33 minutes hydrogenation was 14% completed and proceeding very slowly. At this point, 0.3 g. of $Ca(OH)_2$ was added and hydrogenation was continued. The theoretical amount of hydrogen was absorbed in 1.4 hours. The final temperature was 56° C. The catalyst was recovered from this run as before and a third charge of 30.3 g. (0.13 mole) of 1-bromo-3-nitrobenzene, 150 cc. of methyl alcohol, and 0.3 g. of $Ca(OH)_2$ was added to the recovered catalyst. This mixture was hydrogenated at a pressure of 15–50 p.s.i.g. and at a temperature of 29–40° C. in 1.8 hours.

A fourth run as above was made re-using the catalyst at 30° C. and at 15–50 p.s.i.g. hydrogen pressure. Reaction was complete in 2.5 hours.

The products from the four runs above were combined and distilled to produce m-bromoaniline in 83% yield. F.P., 16° C.

*Example 2.—Effect of Using Less Raney Nickel*

In all the examples above, 3.0 g. of Raney nickel sludge was used for 0.15 mole of 1-bromo-3-nitrobenzene. In the following examples 1.0 g. of Raney nickel sludge was used per 0.15 mole of 1-bromo-3-nitrobenzene with and without $Ca(OH)_2$.

(a) Without added $Ca(OH)_2$—30.3 g. (0.15 mole) 1-bromo-3-nitrobenzene, 150 cc. of methyl alcohol and 1 g. of Raney nickel sludge were combined in the Parr hydrogenator bottle and the hydrogenation run as before at 30° C. and 25–50 p.s.i.g. hydrogen pressure. The theoretical amount of hydrogen was absorbed in 5.7 hours, 22.5 g. of m-bromoaniline, was obtained. The yield was 87.2%. This material had a F.P. of 15.3° C. When 3.0 g. of Raney nickel was used, Example 1, the yield was 75.5% and the product had a F.P. of 10.5° C. An attempt was made to re-use the catalyst from the run, using 1 g. of Raney nickel per 0.15 mole of 1-bromo-3-nitrobenzene, without success. In 18 hours at 30° C. and at a hydrogen pressure of 36–50 p.s.i.g., the conversion was only 43%.

(b) With added $Ca(OH)_2$—30.3 g. (0.15 mole) of 1-bromo-3-nitrobenzene, 150 cc. of methyl alcohol, 1 g. of Raney nickel and 0.3 g. of $Ca(OH)_2$ were combined in the Parr reactor and hydrogenated at 30° C. and 25–46 p.s.i.g. of hydrogen pressure for 6.3 hours. From this run, there was obtained 21.9 g. of m-bromoaniline for a yield of 85.0%. F.P., 15.3° C.

The catalyst from the above run was re-used in a second similar run. The theoretical amount of hydrogen was absorbed in 9.6 hours at 30° C. and 20–55 p.s.i.g. hydrogen pressure. The catalyst from this run was re-used in a third similar run. Reaction was complete in 12.5 hours at 30° C. and 30–50 p.s.i.g. hydrogen pressure. From this run was obtained 22.5 g. of m-bromoaniline. The yield was 87.2%. F.P., 15.3° C.

*Example 3.—Hydrogenation of 4-Bromo-3-Nitrobiphenyl*

13.9 g. (0.05 mole) of 4-bromo-3-nitrobiphenyl, 125 cc. of methyl alcohol, 0.3 g. $Ca(OH)_2$ and 0.5 g. of nickel sludge were combined and the mixture hydrogenated at 39–41.5 p.s.i.g. hydrogen pressure and 40° C. At 21.8% conversion reaction stopped. A second 0.5 g. of Raney nickel was added, and hydrogenation run at 42–49 p.s.i.g. and at 25° C. Reaction stopped at a conversion of 82.5%. A third 0.5 g. of Raney nickel was added and hydrogenation run as above until the theoretical amount of hydrogen was absorbed. The reaction mixture was warmed to 35° C. and filtered. The catalyst cake +$Ca(OH)_2$ were washed with warm methanol. The main filtrate plus the washings were combined and distilled to a residual volume of 35 cc. This solution was cooled and the crystals which formed were filtered off and dried at 40° C. in a vacuum oven. Weight, 10.7 g. of tan crystals M.P. 92–93° C. From the mother liquor was obtained an aditional 0.4 g. of product, M.P. 85–87° C. The yield of product, M.P. 92–93° C., was 86.3%. Two grams of this product recrystallized from aqueous methanol gave 1.6 g. of material, M.P. 95–96° C.

*Example 4.—Preparation of 4-Amino-3-Bromophenol*

(a) Without added $Ca(OH)_2$—21.8 g. (0.1 mole) of 3-bromo-4-nitrophenol, M.P. 135°–136° C., 125 cc. of methanol, and 1 g. of Raney nickel sludge were combined and the mixture hydrogenated at 23.5–43.5 p.s.i.g. hydrogen pressure at about 27° C. in 14 hours. There was obtained 10.6 g. of 4-amino-3-bromophenol, M.P. 152.5°–153.6° C. The yield was 56.4%. No nitro compound was recovered.

(b) With added $Ca(OH)_2$—experiment (a) above was repeated but 0.3 g. of $Ca(OH)_2$ was added. The hydrogenation was completed in 14.5 hours at 20.5 to 43 p.s.i.g. hydrogen pressure at about 27° C. From this run 13.7 g. of 4-amino-3-bromophenol, M.P. 153°–154° C. was obtained. The yield was 72.9%.

*Example 5.—Preparation of 3,4-Dichloroaniline*

In the following two experiments $Ca(OH)_2$ was not added initially. A first run was made without added $Ca(OH)_2$. A second run was made wherein the catalyst from the first run was re-used. In this run reaction stopped when 86% of the theory of hydrogen had been absorbed. Addition of lime at this point caused the reaction to proceed to completion.

28.8 g. (0.15 mole) of 1,2-dichloro-4-nitrobenzene, F.P. 40.3° C., 150 cc. of methanol, and 1 g. of Raney nickel sludge were combined and hydrogenated at 30–52 p.s.i.g. hydrogen pressure and at about 25° C. in 10.25 hours. From this run was obtained 20.8 g. of 3,4-dichloroaniline. The yield was 85.6%.

The catalyst from the above run was combined with 28.8 g. (0.15 mole) of 1,2-dichloro-4-nitrobenzene and 150 cc. of methanol. This mixture was hydrogenated at 30–52 p.s.i.g. hydrogen pressure and at about 25° C. Reaction stopped after 14.5 hours when 86% of the theoretical amount of hydrogen had been absorbed. At this point, 0.3 g. of $Ca(OH)_2$ was added and the mixture hydrogenated at 40–45 p.s.i.g. at 25° C. Reaction was completed in 2 hours. From this run 22.4 g. of 3,4-dichloroaniline was obtained. The yield was 91.3%.

*Example 6.—Preparation of 2,5-Dibromoaniline*

In the following experiments (1) 1,4-dibromo-3-nitrobenzene was hydrogenated to the aniline in the presence of $Ca(OH)_2$ (2) in the absence of $Ca(OH)_2$ reaction was not completed even after the addition of more nickel than had been used in the first of these two runs.

28.1 g. (0.1 mole) of 1,4-dibromo-2-nitrobenzene, 150 cc. of acetone, 3.0 g. of Raney nickel sludge, and 0.3 g. of Ca(OH)$_2$ were combined and hydrogenated at 27–50 p.s.i.g. hydrogen pressure at 25–38° C. in 1.25 hours, 22.2 g. of 2,5-dibromoaniline was obtained. The yield was 88.5%.

The above experiment was repeated but in the absence of Ca(OH)$_2$. In 5.6 hours reaction stopped when 91.6 of the theoretical amount of hydrogen had been absorbed. Addition of an additional 1 g. of Raney nickel sludge had no effect on the reaction.

While methanol was used as an inert diluent in the above examples, other inert solvents, as hereinbefore set forth, may be used likewise, or the hydrogenation may be conducted without use of any solvent.

Results substantially equivalent to those shown in the above examples were obtained when the calcium hydroxide there used was replaced with an equivalent amount of calcium carbonate, calcium acetate, magnesium hydroxide, sodium acetate or sodium carbonate.

Likewise, the halonitrobenzenes used in the above examples may be replaced with any of a great variety of halonitrobenzenes wherein the benzene ring may contain as substituent groups, fluorine, bromine, chlorine, alkyl, phenyl, substituted phenyl, hydroxyl, carboxyl carboxyalkyl, or, in general, any substituent group that is less reactive to catalytic hydrogenation than is the nitro group.

We claim:

1. A process for producing an aromatic primary haloamine wherein the halogen has an atomic number below 36 comprising hydrogenating the corresponding nitro compound at a temperature of about 20 to 100° C. and a hydrogen pressure of about 1 to 30 atmospheres and in the presence of a catalytic amount of nickel and a catalyst promotor selected from the group consisting of calcium and magnesium hydroxides, sodium and calcium carbonates and sodium and calcium acetates.
2. A process as defined in claim 1 wherein the amine is a haloaniline.
3. A process as defined in claim 1 wherein the amine is a bromoaniline.
4. A process as defined in claim 1 wherein the amine is a chloroaniline.
5. A process as defined in claim 1 wherein the amine is a haloaminophenol.
6. A process as defined in claim 1 wherein the amine is a halobiphenylamine.
7. A process as defined in claim 1 wherein the promotor is calcium hydroxide.
8. A process as defined in claim 1 wherein the promotor is calcium acetate.
9. A process as defined in claim 1 wherein the promotor is sodium carbonate.
10. A process as defined in claim 1 wherein the promotor is sodium acetate.
11. A process as defined in claim 1 wherein the promotor is magnesium hydroxide.
12. A process as defined in claim 1 wherein the promotor is calcium carbonate.
13. A process as defined in claim 1 wherein the catalyst is Raney nickel.
14. A process for converting a halonitrobenzene compound, wherein the halogen has an atomic number below 36, to the corresponding haloaniline comprising hydrogenating the nitro compound at a temperature of about 20 to 100° C. and a hydrogen pressure of about 1 to 30 atmospheres and in the presence of a catalytic amount of finely divided metallic nickel and about 0.01 to 1.0 part, by weight, per part of nickel, of a catalyst promotor selected from the group consisting of calcium and magnesium hydroxides, sodium and calcium carbonates and sodium and calcium acetates.
15. A process as defined in claim 14 wherein the halonitrobenzene compound is 3-bromo-nitrobenzene.
16. A process as defined in claim 14 wherein the halonitrobenzene compound is 3,4-dichloronitrobenzene.
17. A process as defined in claim 14 wherein the halonitrobenzene compound is 2,5-dibromonitrobenzene.
18. A process as defined in claim 14 wherein the halonitrobenzene compound is 3-bromo-4-nitrophenol.
19. A process as defined in claim 14 wherein the halonitrobenzene compound is 4-bromo-3-nitrobiphenyl.

References Cited in the file of this patent

UNITED STATES PATENTS

| | | |
|---|---|---|
| 2,105,321 | Henke et al. | Jan. 11, 1938 |
| 2,131,734 | Henke et al. | Oct. 4, 1938 |
| 2,164,154 | Henke et al. | June 27, 1939 |
| 2,183,019 | Henke et al. | Dec. 12, 1939 |
| 2,458,214 | Souders | Jan. 4, 1949 |
| 2,464,044 | Kamlet | Mar. 8, 1949 |
| 2,464,194 | Zimmerman | Mar. 8, 1949 |
| 2,823,235 | Graham | Feb. 11, 1958 |

UNITED STATES PATENT OFFICE
CERTIFICATE OF CORRECTION

Patent No. 3,067,253                             December 4, 1962

Andrew J. Dietzler et al.

It is hereby certified that error appears in the above numbered patent requiring correction and that the said Letters Patent should read as corrected below.

Column 6, list of references cited, add the following:

FOREIGN PATENTS 279,632    Switzerland --- Mar. 17, 1952

Signed and sealed this 19th day of March 1963.

(SEAL)
Attest:

ESTON G. JOHNSON                                   DAVID L. LADD
Attesting Officer                                           Commissioner of Patents